(12) United States Patent
Roberts et al.

(10) Patent No.: US 8,572,986 B2
(45) Date of Patent: Nov. 5, 2013

(54) RETAINER FOR SUSPENDED THERMAL PROTECTION ELEMENTS IN A GAS TURBINE ENGINE

(75) Inventors: Steven D. Roberts, Moodus, CT (US); Jocelyn Charis Damgaard, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 1358 days.

(21) Appl. No.: 12/510,216

(22) Filed: Jul. 27, 2009

(65) Prior Publication Data
US 2011/0016880 A1    Jan. 27, 2011

(51) Int. Cl.
*F02K 1/82*    (2006.01)

(52) U.S. Cl.
USPC ............................................. 60/796; 60/770

(58) Field of Classification Search
USPC ............. 60/770, 771, 39.5, 796; 16/253, 262; 411/351, 521; 248/58, 60, 62
See application file for complete search history.

(56) References Cited

U.S. PATENT DOCUMENTS

| | | |
|---|---|---|
| 3,098,352 A | 7/1963 | Taub |
| 3,387,788 A | 6/1968 | Brown |
| 3,391,869 A * | 7/1968 | Glass ....................... 239/265.19 |
| 3,814,325 A | 6/1974 | McCardle, Jr. et al. |
| 3,979,067 A | 9/1976 | Nash |
| 4,000,854 A | 1/1977 | Konarski et al. |
| 4,013,226 A | 3/1977 | Willard |
| 4,013,976 A | 3/1977 | Hill et al. |
| 4,361,281 A | 11/1982 | Nash |
| 4,420,932 A | 12/1983 | Mendez et al. |
| 4,587,806 A | 5/1986 | Madden |
| 4,706,453 A | 11/1987 | Vivace |
| 4,813,607 A | 3/1989 | Hill et al. |
| 5,050,803 A | 9/1991 | Wakeman et al. |
| 5,102,050 A | 4/1992 | Sedziol et al. |
| 5,103,638 A | 4/1992 | Roberts et al. |
| 5,111,992 A | 5/1992 | Barcza |
| 5,140,809 A | 8/1992 | Taylor |
| 5,150,839 A | 9/1992 | Reedy |
| 5,154,052 A | 10/1992 | Giffin, III et al. |
| 5,174,502 A | 12/1992 | Lippmeier et al. |
| 5,209,428 A | 5/1993 | Bevilaqua et al. |
| 5,215,256 A | 6/1993 | Barcza |
| 5,224,822 A | 7/1993 | Lenahan et al. |
| 5,226,598 A | 7/1993 | Woehrl |
| 5,235,808 A | 8/1993 | Taylor |
| 5,239,815 A | 8/1993 | Barcza |
| 5,261,229 A | 11/1993 | Ford et al. |
| 5,291,732 A | 3/1994 | Halila |
| 5,291,733 A | 3/1994 | Halila |
| 5,335,489 A | 8/1994 | Thayer |
| 5,370,497 A | 12/1994 | Doi et al. |
| 5,388,765 A | 2/1995 | Hill et al. |
| 5,396,761 A | 3/1995 | Woltmann et al. |
| 5,396,763 A | 3/1995 | Mayer et al. |
| 5,407,133 A | 4/1995 | Liang |
| 5,480,283 A | 1/1996 | Doi et al. |

(Continued)

*Primary Examiner* — Ehud Gartenberg
*Assistant Examiner* — Scott Walthour
(74) *Attorney, Agent, or Firm* — Carlson, Gaskey & Olds, P.C.

(57) ABSTRACT

A hanger system includes a pin with a head section which defines a pin axis. A clip assembly captures the head section to permit movement of the pin within a hanger in a direction transverse to the pin axis. A fastener which retains the clip assembly to the hanger.

15 Claims, 19 Drawing Sheets

(56) References Cited

U.S. PATENT DOCUMENTS

| | | |
|---|---|---|
| 5,485,959 A | 1/1996 | Wood et al. |
| 5,535,585 A | 7/1996 | Eichhorn |
| 5,769,317 A | 6/1998 | Sokhey et al. |
| 5,813,609 A | 9/1998 | Ellerhorst |
| 5,833,140 A | 11/1998 | Loffredo et al. |
| 5,897,120 A | 4/1999 | Scavo et al. |
| 6,045,310 A | 4/2000 | Miller et al. |
| 6,095,750 A | 8/2000 | Ross et al. |
| 6,105,901 A | 8/2000 | Ulanoski et al. |
| 6,142,416 A | 11/2000 | Markstein et al. |
| 6,199,772 B1 | 3/2001 | Renggli |
| 6,301,877 B1 | 10/2001 | Liang et al. |
| 6,318,668 B1 | 11/2001 | Ulanoski et al. |
| 6,352,211 B1 | 3/2002 | Bentley |
| 6,382,559 B1 | 5/2002 | Sutterfield et al. |
| 6,463,739 B1 | 10/2002 | Mueller et al. |
| 6,495,207 B1 | 12/2002 | Prociw et al. |
| 6,773,215 B2 | 8/2004 | Cuva et al. |
| 6,775,985 B2 | 8/2004 | Mitchell et al. |
| 6,857,600 B1 | 2/2005 | Walker et al. |
| 6,918,244 B2 | 7/2005 | Dickau |
| 7,093,440 B2 | 8/2006 | Howell et al. |
| 7,216,476 B2 | 5/2007 | Fink |
| 7,263,772 B2 | 9/2007 | Prociw et al. |
| 7,269,958 B2 | 9/2007 | Stastny et al. |
| 7,300,246 B2 | 11/2007 | Durocher et al. |
| 7,395,657 B2 | 7/2008 | Johnson |
| 7,430,867 B2 | 10/2008 | Agg |
| 7,441,409 B2 | 10/2008 | Patel et al. |
| 7,451,600 B2 | 11/2008 | Patel et al. |
| 7,475,548 B2 | 1/2009 | Toffan et al. |
| 7,493,771 B2 | 2/2009 | Lohmueller et al. |
| 7,509,809 B2 | 3/2009 | Patel et al. |
| 7,523,616 B2 | 4/2009 | Zigan et al. |
| 2002/0079738 A1* | 6/2002 | Doyle .................. 305/185 |
| 2008/0022689 A1* | 1/2008 | Farah et al. .................. 60/770 |

* cited by examiner

US 8,572,986 B2

RETAINER FOR SUSPENDED THERMAL PROTECTION ELEMENTS IN A GAS TURBINE ENGINE

STATEMENT REGARDING FEDERALLY SPONSORED RESEARCH OR DEVELOPMENT

This disclosure was made with Government support under F33657-99-D-2051-0019 awarded by The United States Air Force. The Government has certain rights in this disclosure.

BACKGROUND

The present disclosure relates to a gas turbine engine, and more particularly to a hanger assembly which supports a liner panel which separate a core flow from a bypass flow.

A gas turbine engine exhaust duct includes a liner disposed between the engine core exhaust gas flow path and the engine bypass flow path to define a bypass duct between the liner and engine static structure. Cooling air is flowed through the bypass duct over the length of the exhaust duct then discharged over seals and flaps of the nozzle located at the aft end section of the exhaust duct.

The liner is suspended from the engine static structure with a hanger system that includes pins and spring clips to retain the liner and accommodate the thermal variance during various conditions of engine operation. In some situations, the retention feature for the pins provided by the spring clips may be defeated by accelerated wear and mechanical disengagement of the spring clips.

SUMMARY

A hanger system according to an exemplary aspect of the present disclosure includes a pin with a head section which defines a pin axis. A clip assembly captures the head section to permit movement of the pin within a hanger in a direction transverse to the pin axis. A fastener which retains the clip assembly to the hanger.

A nozzle for a gas turbine engine according to an exemplary aspect of the present disclosure includes a pin with a head section which defines a pin axis. A clip assembly captures the head section to permit movement of the pin within a hanger in a direction traverse to the pin axis. A fastener which retains the clip assembly to the hanger. The hanger attached to the liner panel and an eye-bolt attached to the pin and the static structure.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
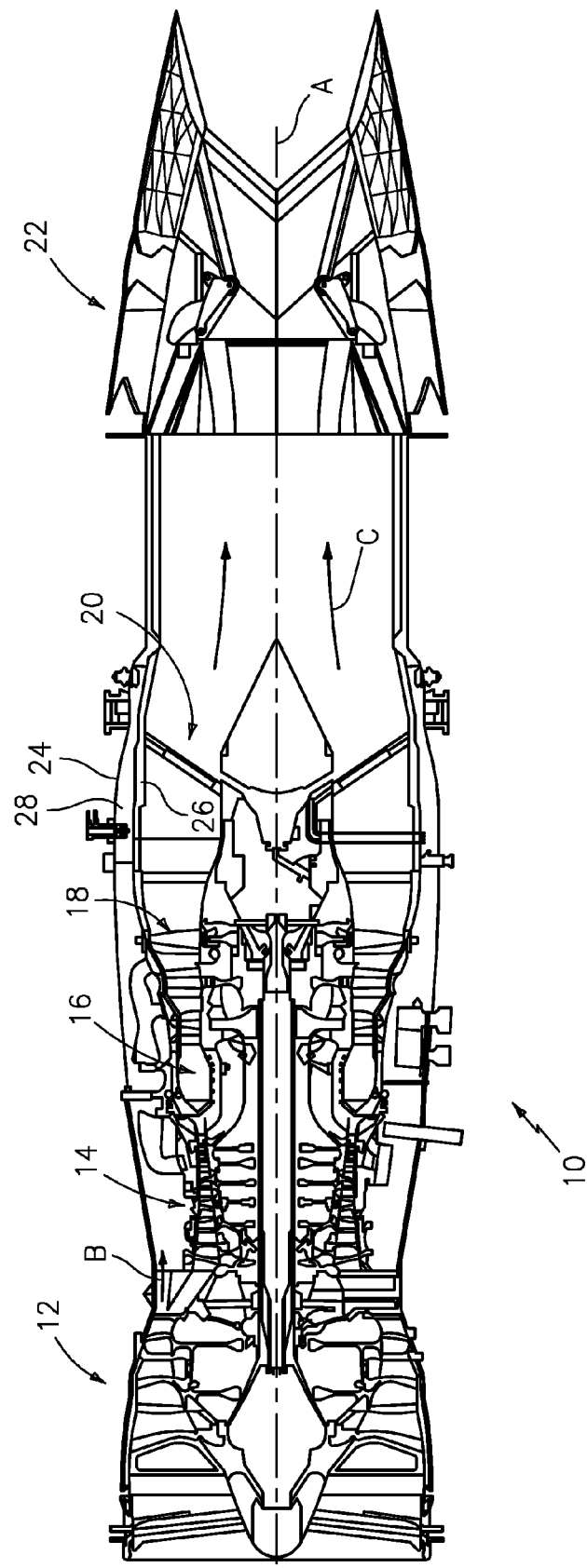
FIG. 1 is a general schematic longitudinal sectional view an exemplary gas turbine engine embodiment for use with the present disclosure.

FIG. 1 schematically illustrates a gas turbine engine 10 which generally includes a fan section 12, a compressor section 14, a combustor section 16, a turbine section 18, an augmentor section 20, and a nozzle section 22. The compressor section 14, combustor section 16, and turbine section 18 are generally referred to as the core engine. The gas turbine engine 10 defines a longitudinal axis A which is centrally disposed and extends longitudinally through each section. The gas turbine engine 10 of the disclosed non-limiting embodiment is a low bypass augmented gas turbine engine having a two-stage fan, a six-stage compressor, an annular combustor, a single stage high-pressure turbine, a single stage low-pressure turbine and a two-dimensional vectoring convergent/divergent nozzle, however, various gas turbine engines will benefit from this disclosure.

Air compressed in the compressor section 14 is mixed with fuel, burned in the combustor section 16 and expanded in turbine section 18. The turbine section 18, in response to the expansion, drives the compressor section 14 and the fan section 12. The air compressed in the compressor section 14 and the fuel mixture expanded in the turbine section 18 may be referred to as the core flow C. Air from the fan section 12 is divided between the core flow C and a bypass or secondary flow B. Core flow C follows a path through the combustor section 16 and also passes through the augmentor section 20 where fuel may be selectively injected into the core flow C and burned to impart still more energy to the core flow C and generate additional thrust from the nozzle section 22.

An outer engine case 24 and an inner structure 26 define a generally annular secondary bypass duct 28 around a core flow C. It should be understood that various structure within the engine may be defined as the outer engine case 24 and the inner structure 26 to define various secondary flow paths such as the disclosed bypass duct 28. The core engine is arranged generally within the bypass duct 28. The bypass duct 28 separates airflow sourced from the fan section 12 and/or compressor section 14 as the secondary flow B between the outer engine case 24 and the inner structure 26. The secondary flow B also generally follows a generally annular path parallel to the axis A of the engine 10, passing through the bypass duct 28 along the periphery of the engine 10.

Figure 2:
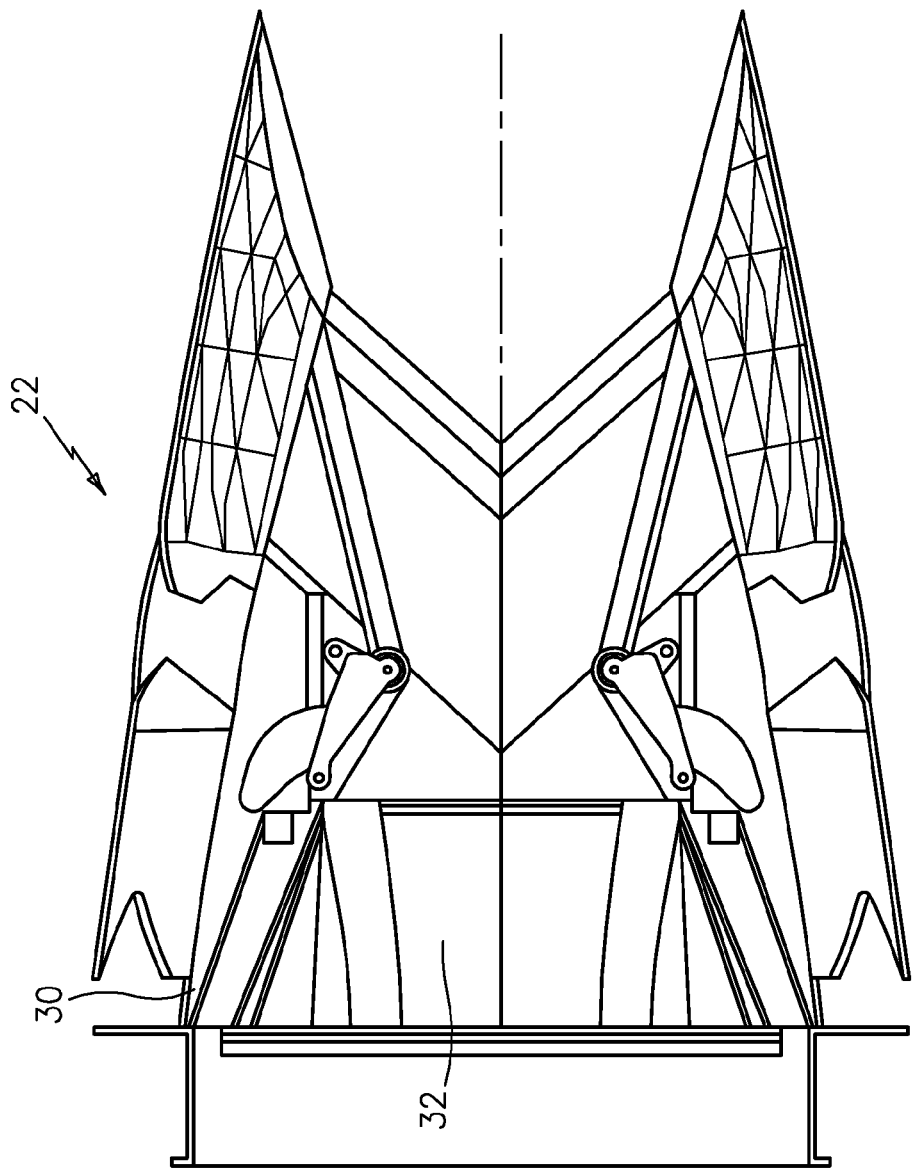
FIG. 2 is an expanded longitudinal sectional view of a nozzle section of the gas turbine engine.
Figure 3:
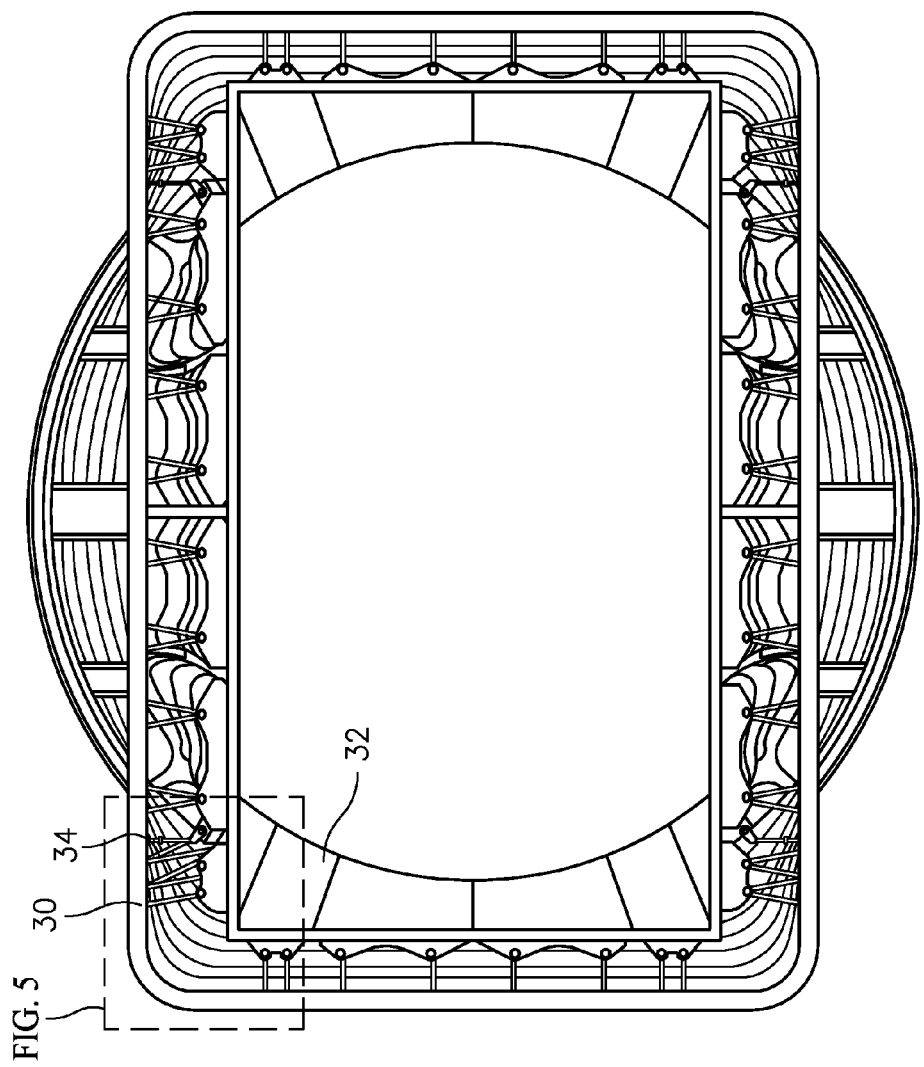
FIG. 3 is an expanded end view of the nozzle section looking aft to forward through the nozzle section.
Figure 4:
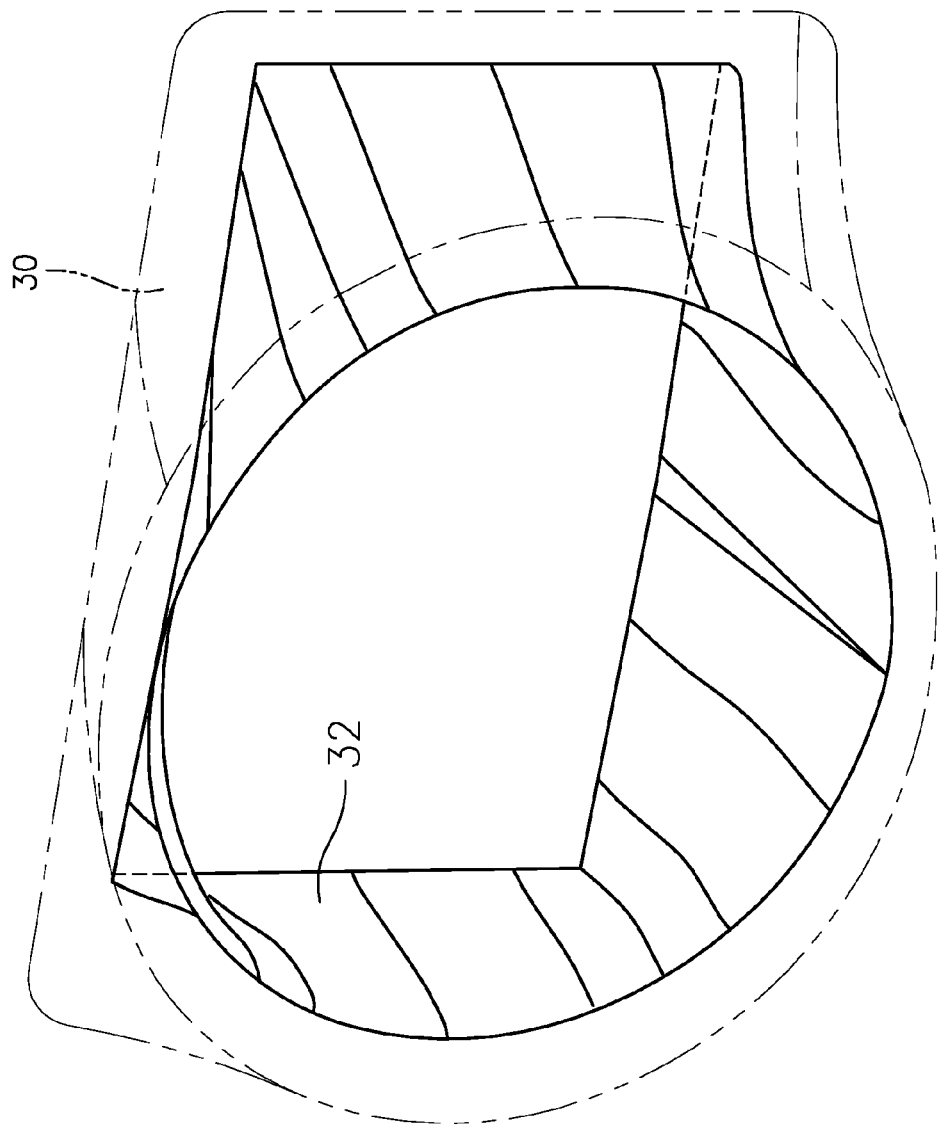
FIG. 4 is an expanded phantom view of the nozzle section to show the liner panel arrangement within the static structure.
Figure 5:
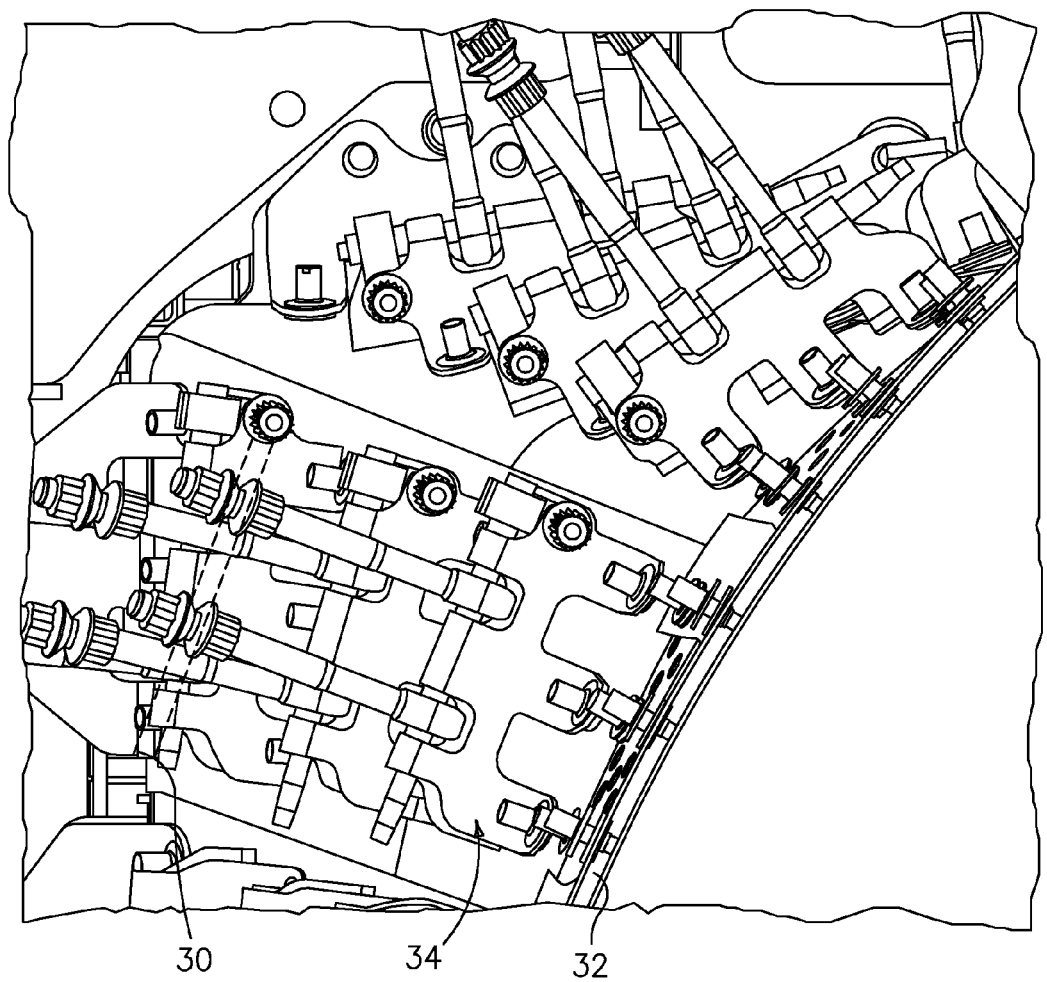
FIG. 5 is an expanded perspective view of a hanger system within the nozzle section.

Referring to FIG. 2, the nozzle section 22 includes a static structure 30 from which liner panels 32 are suspended by a hanger system 34 (FIG. 3). The static structure 30 in the disclosed non-limiting embodiment is rectilinear in cross-section and typically referred to as a T-duct (FIG. 3). The liner panels 32 separate the core flow C from the bypass flow B and transition from a circular cross-section to a rectilinear in cross-section (FIG. 4) typical of a two-dimensional vectoring convergent/divergent nozzle, however, various liner panels within various sections of the gas turbine engine will also benefit from this disclosure. The corner sections may have particular applicability to the hanger system 34 disclosed herein (FIG. 5).

Figure 6:
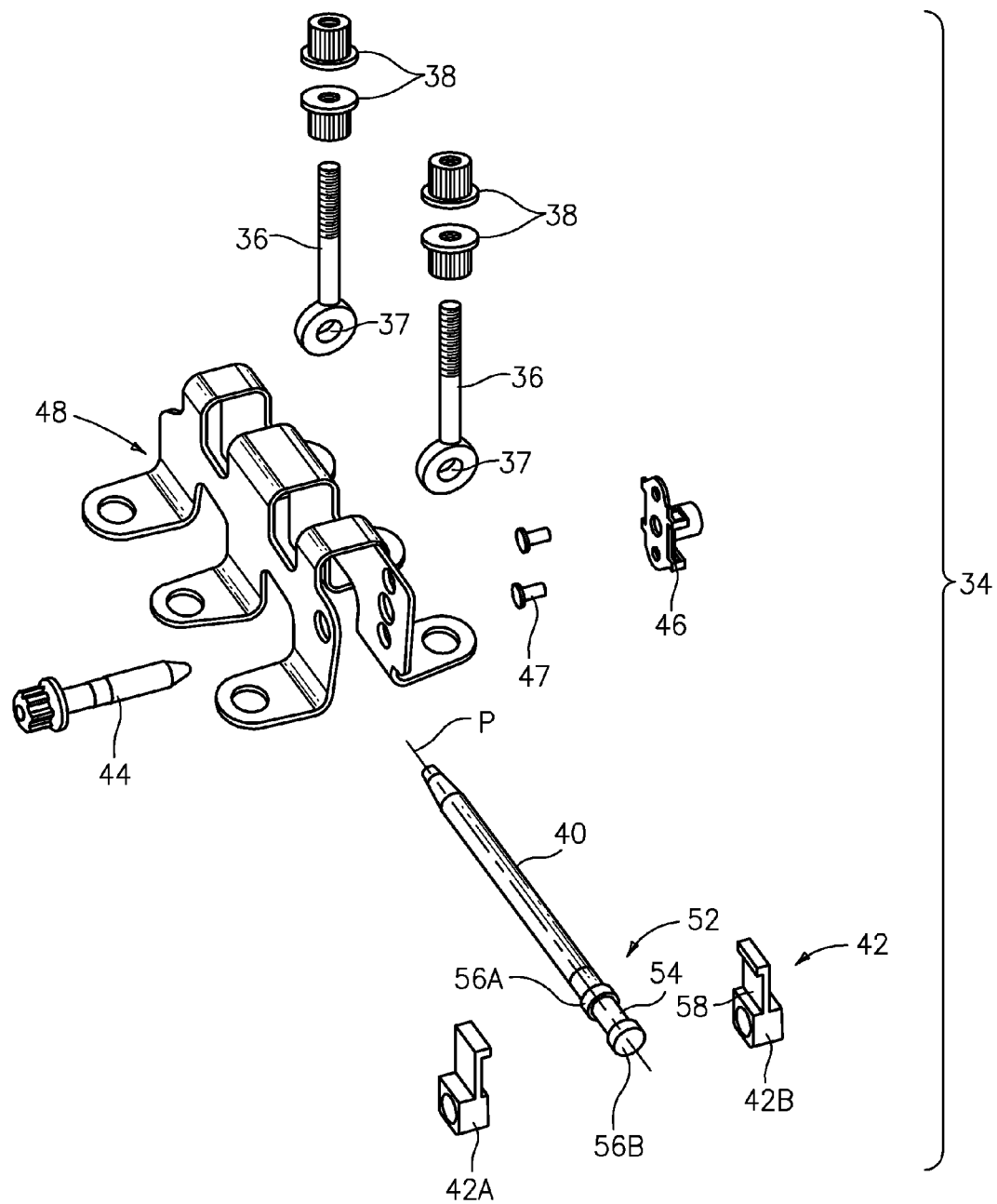
FIG. 6 is an exploded view of a hanger system according to one non-limiting embodiment.

Referring to FIG. 6, the hanger system 34 generally includes an eye-bolt 36, eye-bolt fasteners 38, a pin 40 a clip assembly 42, a fastener 44, nutplate 46 and a hanger 48. The nutplate 46 may be fastened to the hanger 48 through fasteners such as rivets 47. The hanger system 34 facilitates assembly by minimization of relatively small, loose components.

The hanger system 34 provides positive retention of the pin 40 to the liner panels 32 through the eye-bolt 36 that includes an eye 37 through which the pin 40 is received. The eye-bolt 36 is attached to the static structure 30 through the eye-bolt fasteners 38 which, in the disclosed non-limiting embodiment, may include a nut threaded to the eye-bolt 36 on each side of the static structure 30 (FIG. 5). The hanger 48 is attached to the liner panel 32 through fasteners such as rivets.

Figure 7:
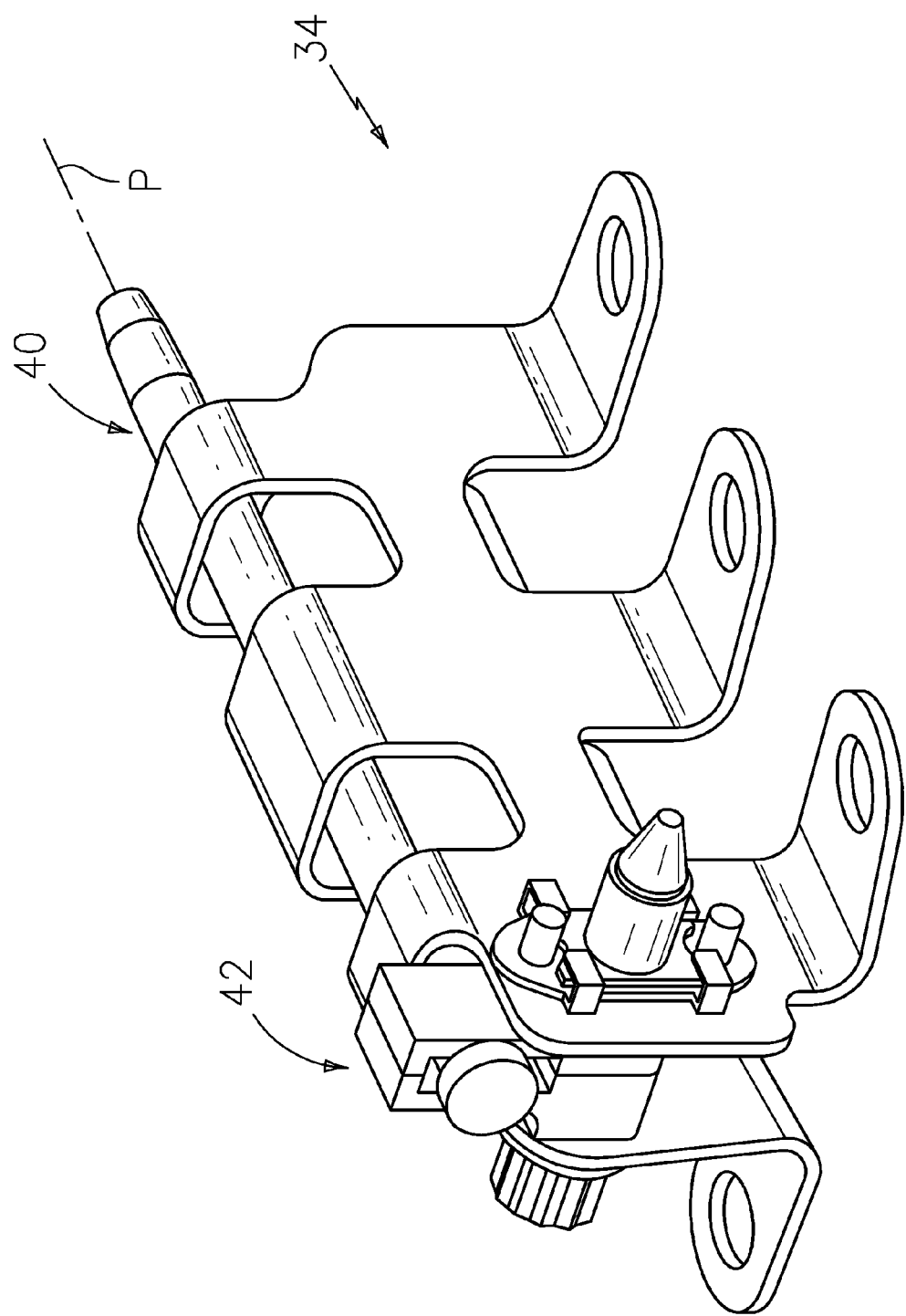
FIG. 7 is an assembled view of the hanger system of FIG. 6.

The pin 40 includes a head section 52 defined along a pin axis P. The head section 52 includes a rectilinear section 54 between circular sections 56A, 56B. The rectilinear section 54 corresponds with a slot 58 defined by the clip portions 42A, 42B of the clip assembly 42 (FIG. 7). The clip assembly 42 is bolted to the hanger 48 through the fastener 44 and nutplate 46 to eliminate clip assembly 42 motion relative to the hanger 48.

Figure 8:
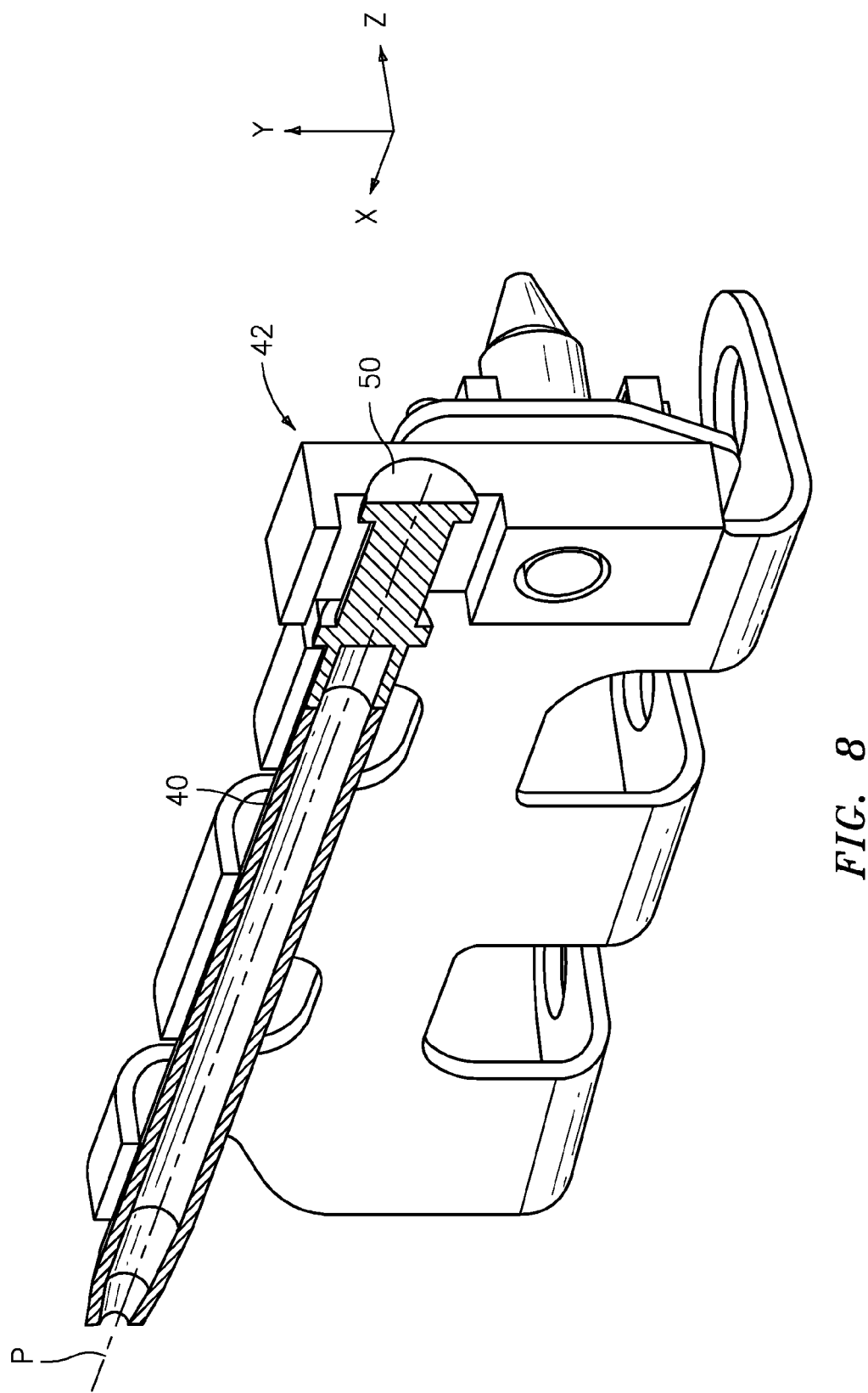
FIG. 8 is a longitudinal sectional view of the hanger system of FIG. 6.

Referring to FIG. 8, the clip assembly 42 captures the pin head section 50 therein (FIG. 8). That is, the pin head section 50 dovetails with the clip assembly 42. The clip assembly 42 permits movement in the Y-direction yet minimizes pin 40 rotational motion and axial motion around and in the X-axis to thereby maintain impact loads below a desired wear threshold. That is, the hanger system 34 utilizes a positive engagement of the clip assembly 42 to the hanger 48 and controlled engagement of pin 40.

Figure 9:
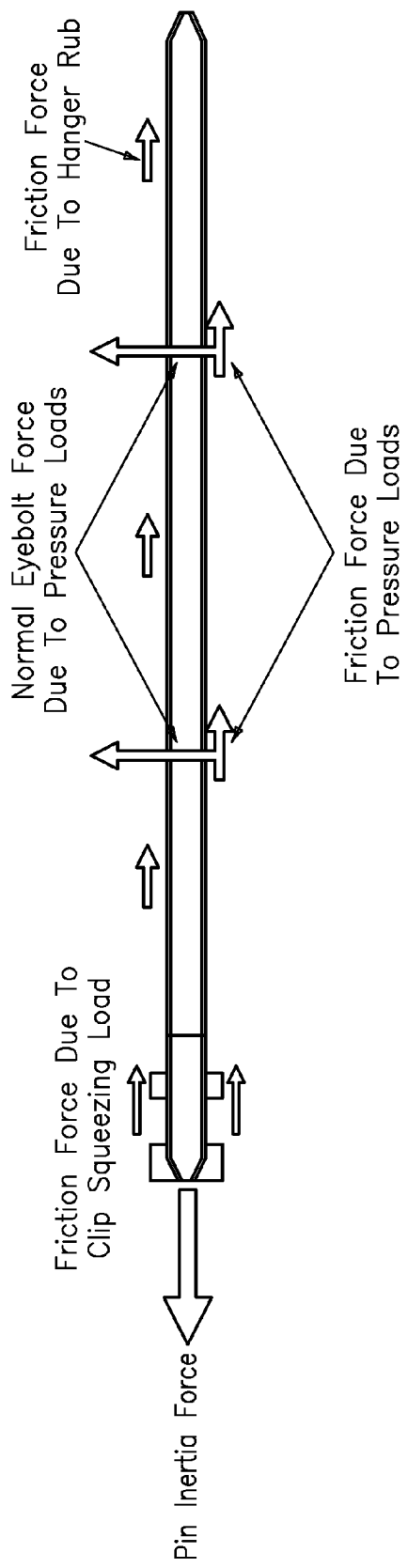
FIG. 9 is a schematic view of the forces applied to the pin of the hanger system.

The hanger system 34 provides a captive feature which cannot be defeated by vibratory accelerations. Wear of the retention features is also substantially reduced by limiting the amount of travel that the pin 40 can experience which in turn reduces acceleration of the impact/contact stress of wear surfaces (FIG. 9). The hanger system 34 prevents a change in the load path between the liner panels and the static structure in order to minimize system level impacts. The hanger system 34 also reduces weight in order to reduce any change in the suspended weight of the liner panels.

Figure 10:
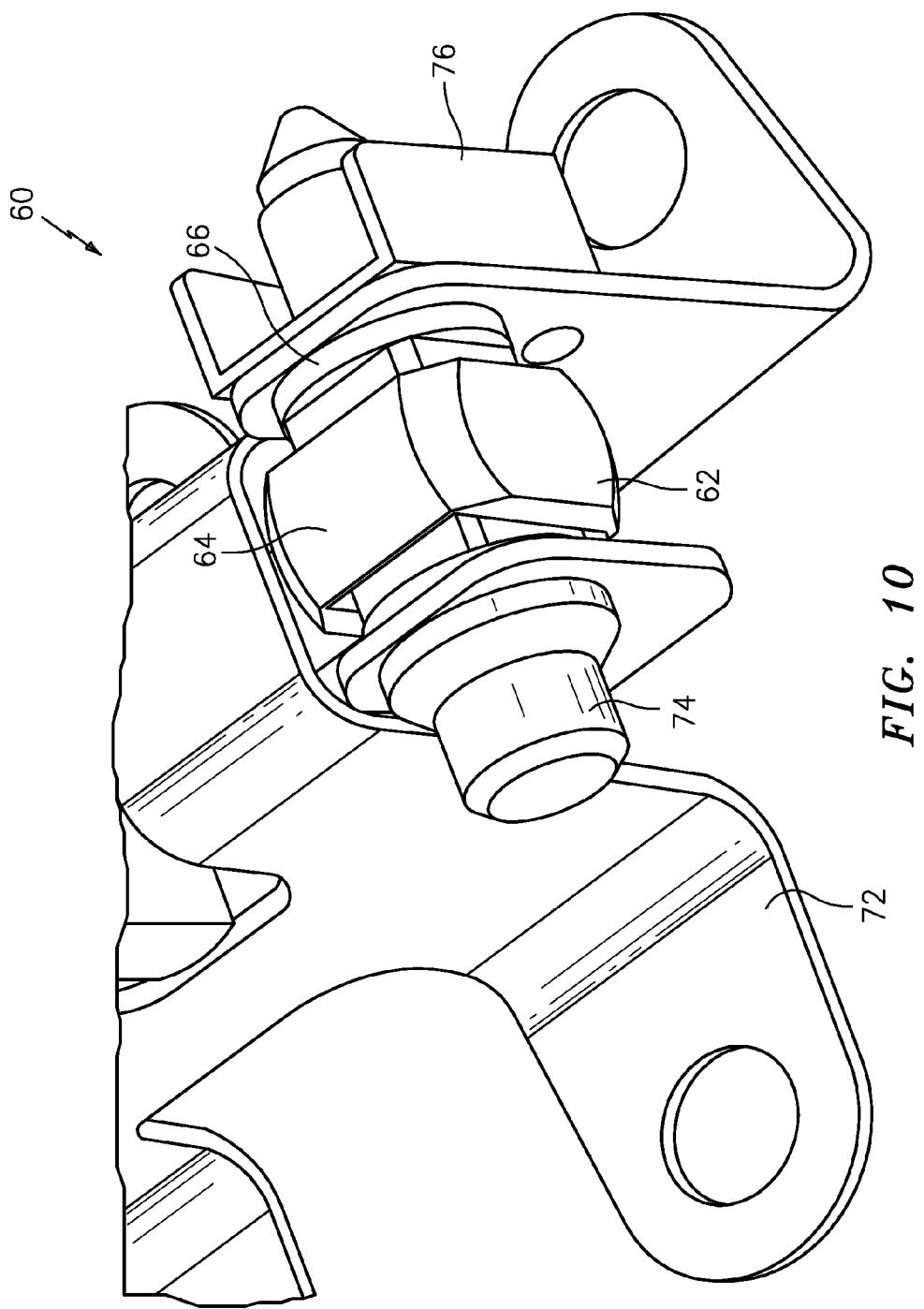
FIG. 10 is an expanded perspective view of a hanger system according to another non-limiting embodiment.
Figure 11:
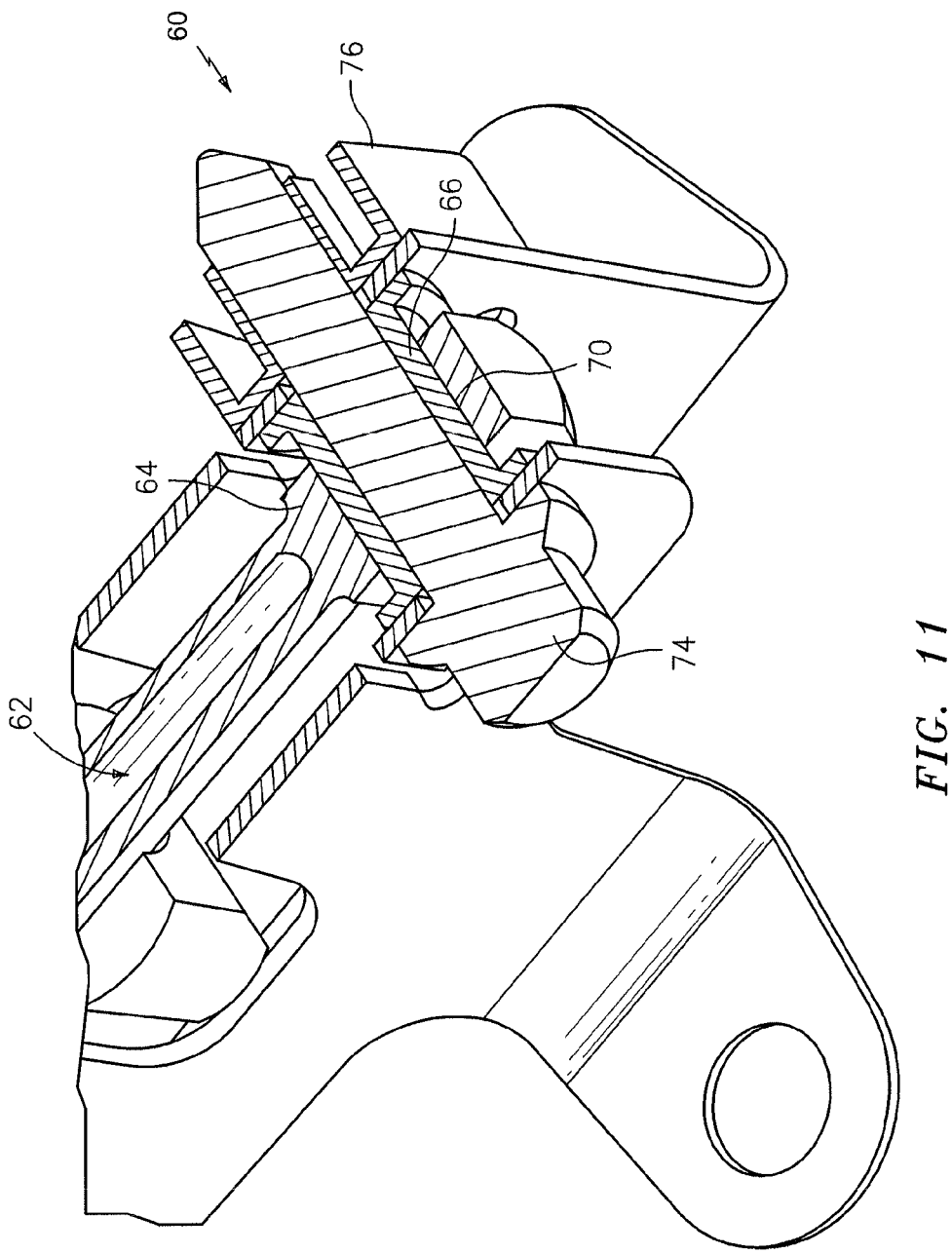
FIG. 11 is a horizontal longitudinal sectional view of the hanger system of FIG. 10.
Figure 12:
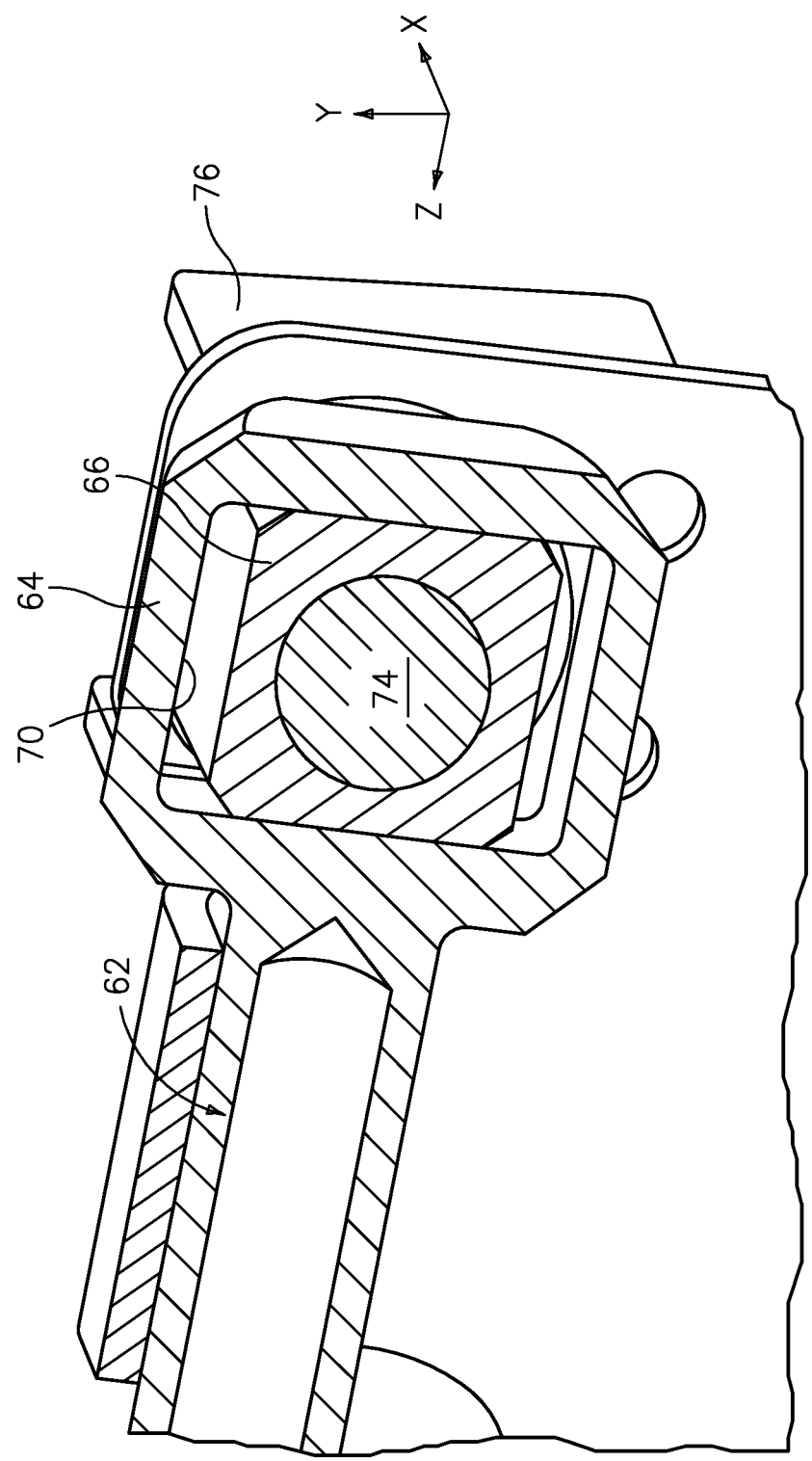
FIG. 12 is a vertical longitudinal sectional view of the hanger system of FIG. 10.

Referring to FIGS. 10-12, another non-limiting embodiment of a hanger system 60 generally includes a pin 62 with an aperture head 64 and a clip portion 66. The aperture head 64 includes a rectilinear aperture 70 which receives the clip portion 66 which is also rectilinear (FIG. 12). The clip portion 66 is bolted to a hanger 72 through a fastener 74 and a nutplate 76 as discussed above. The aperture 70 to clip portion 66 interface permits movement in the Y-direction yet minimizes pin 62 rotational motion and axial motion in the X-axis. The rectilinear aperture 70 in the disclosed non-limiting embodiment is a square.

Figure 13:
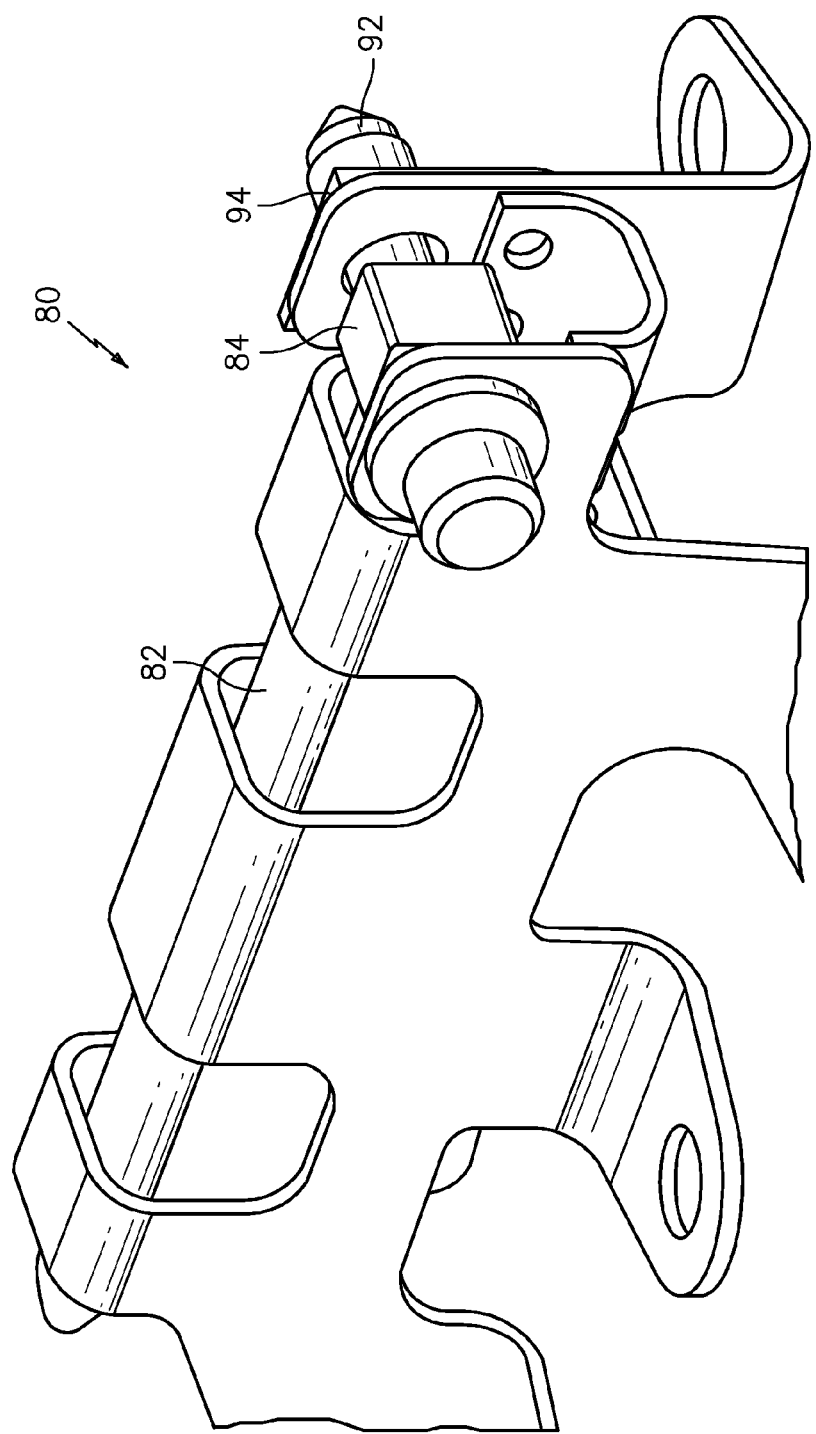
FIG. 13 is a perspective view of a hanger system according to another non-limiting embodiment.
Figure 14:
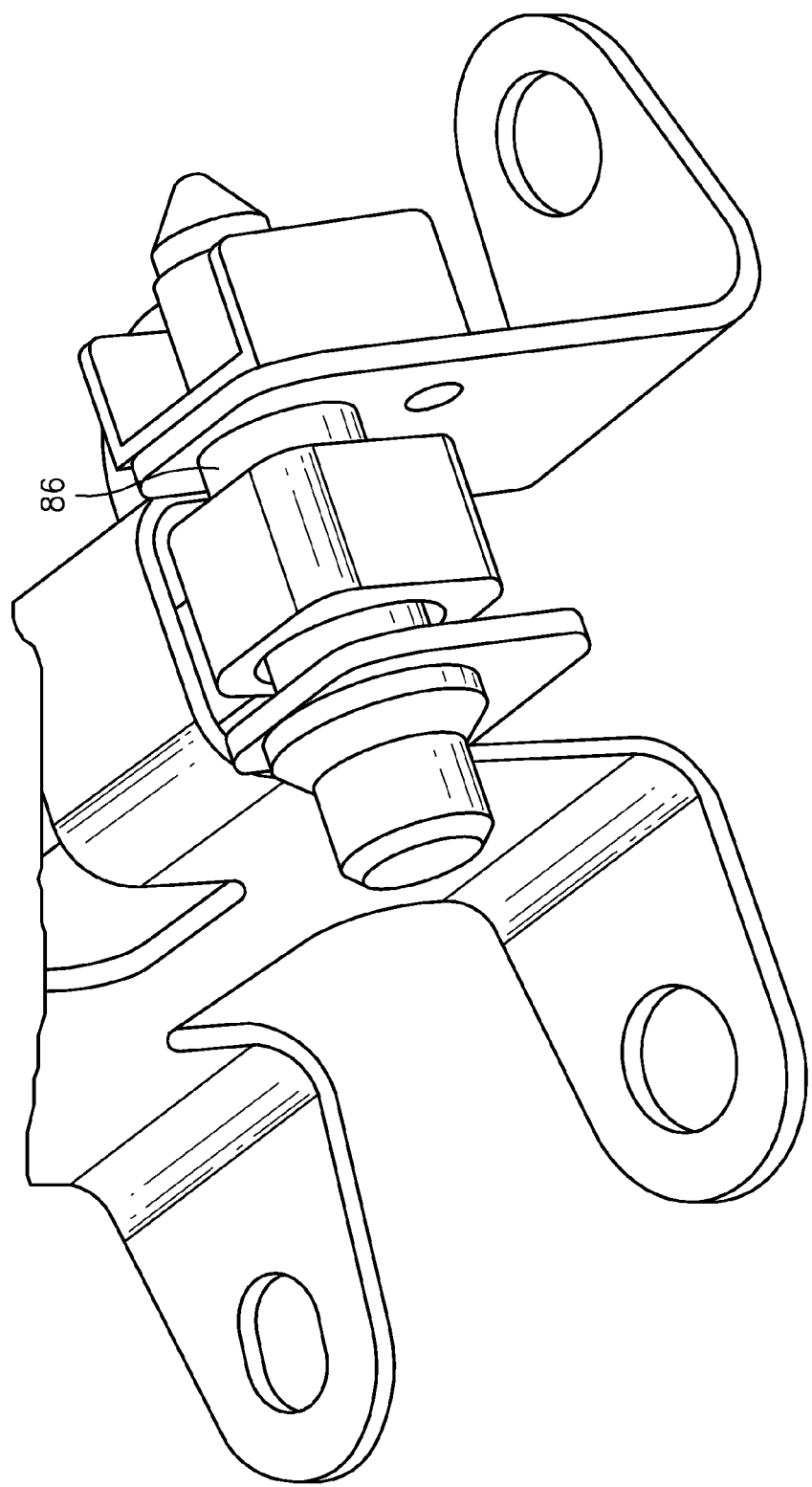
FIG. 14 is an expanded view of the hanger system of FIG. 13.
Figure 15:
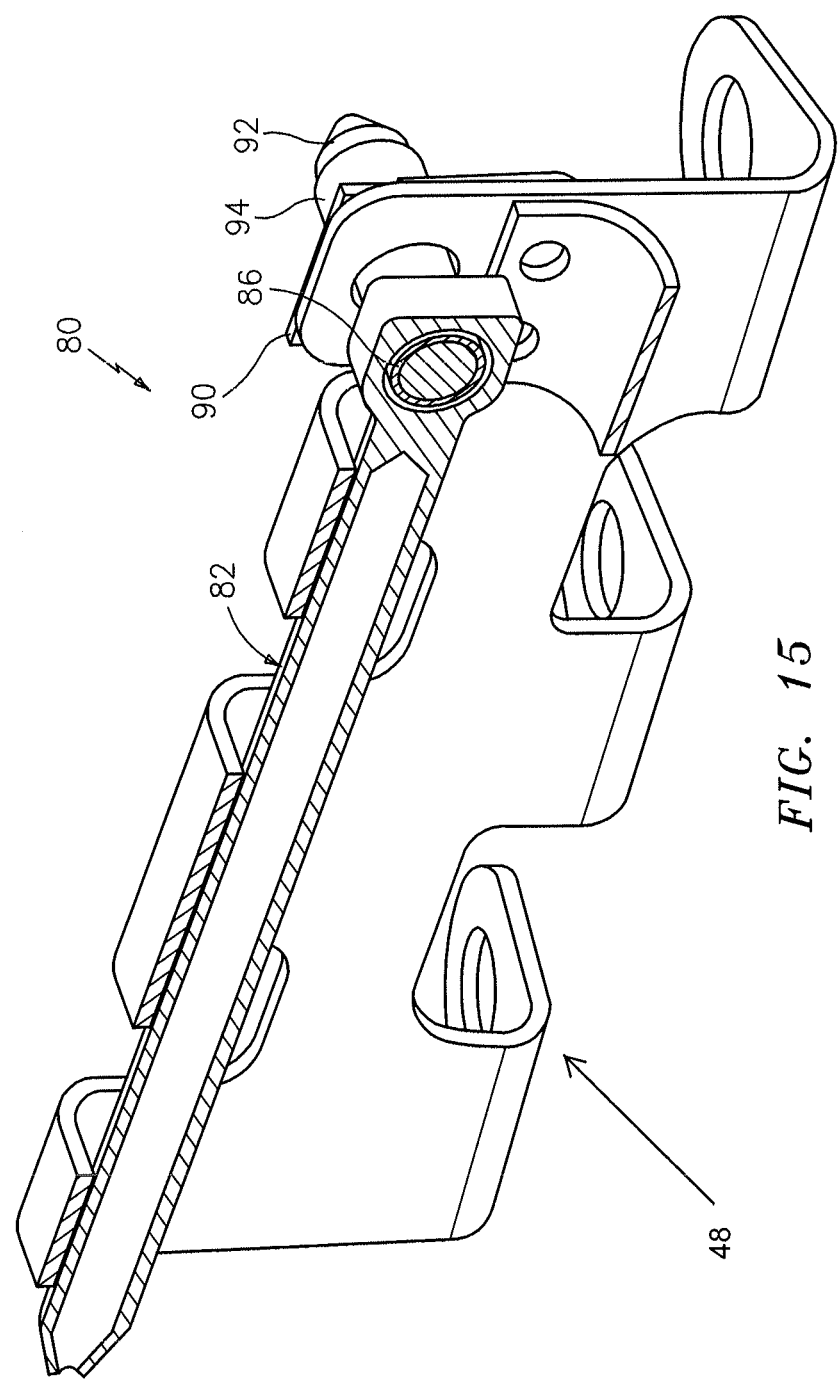
FIG. 15 is a vertical longitudinal sectional view of the hanger system of FIG. 13.

Referring to FIGS. 13-15, another non-limiting embodiment of a hanger system 80 generally includes a pin 82 with an aperture head 84 and a clip portion 86. The aperture head 84 includes a slot aperture 90 to receive the clip portion 86 which is cylindrical. The clip portion 86 is bolted to a hanger 48 through a fastener 92 and a nutplate 94 as discussed above. The aperture 90 to clip portion 86 interface permits movement in the Y-direction yet minimizes pin 82 rotational motion and axial motion in the X-axis. That is, the clip portion 86 fits closely within the slot aperture 90 in the X-direction but provides space within the Y-direction to provide movement therein.

Figure 16:
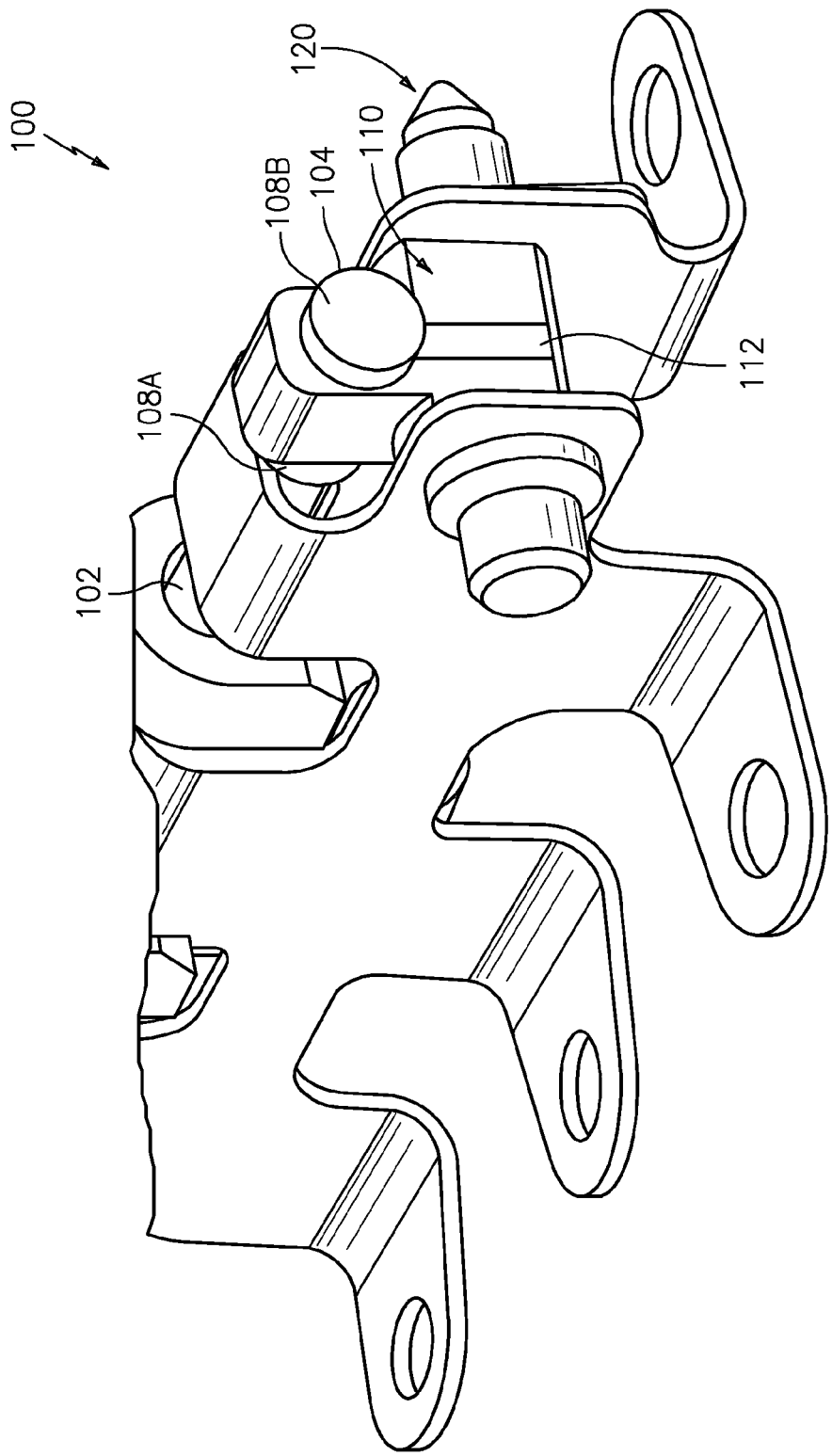
FIG. 16 is a perspective view of a hanger system according to another non-limiting embodiment.
Figure 17:
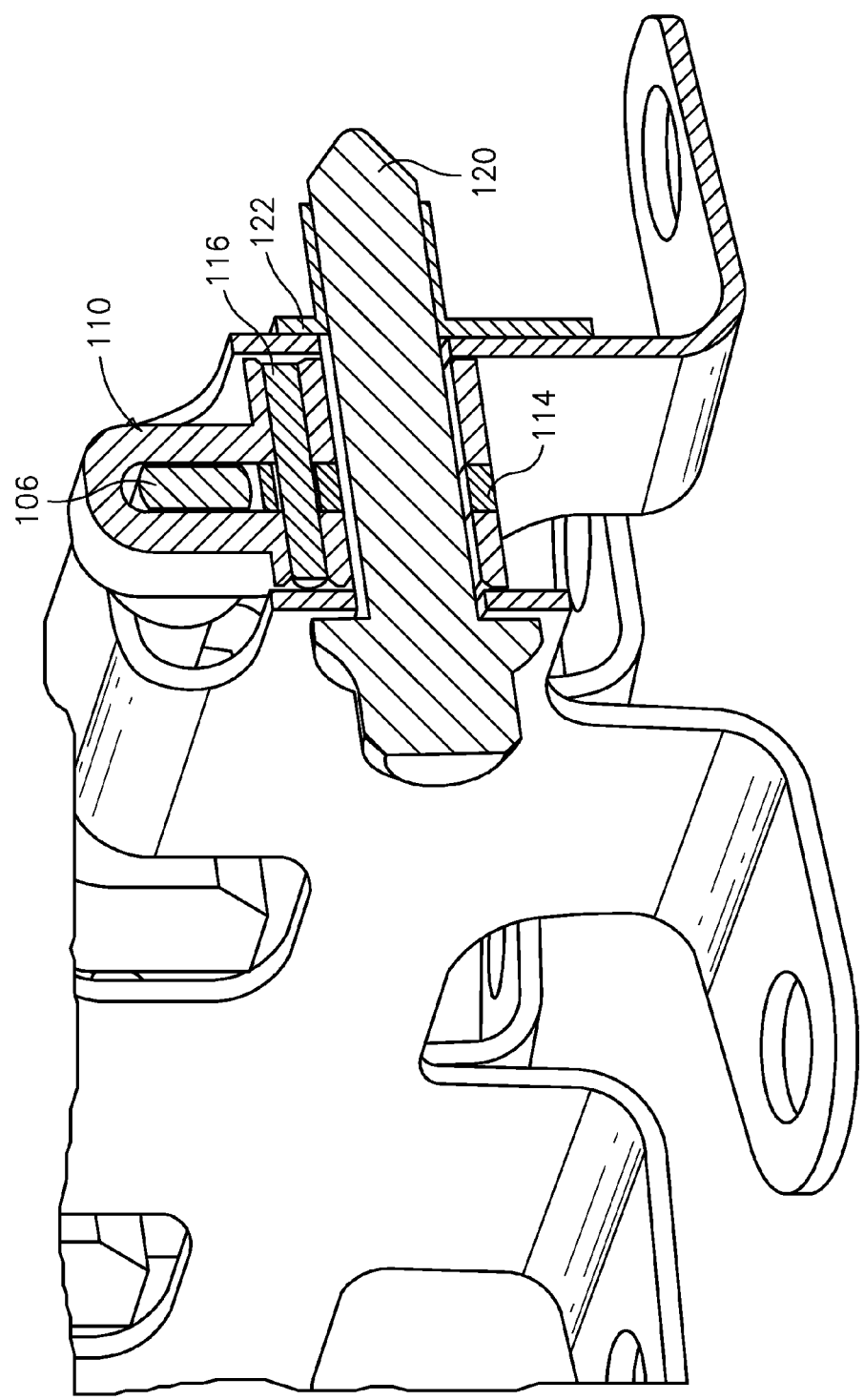
FIG. 17 is a lateral sectional view of the hanger system of FIG. 16.
Figure 18:
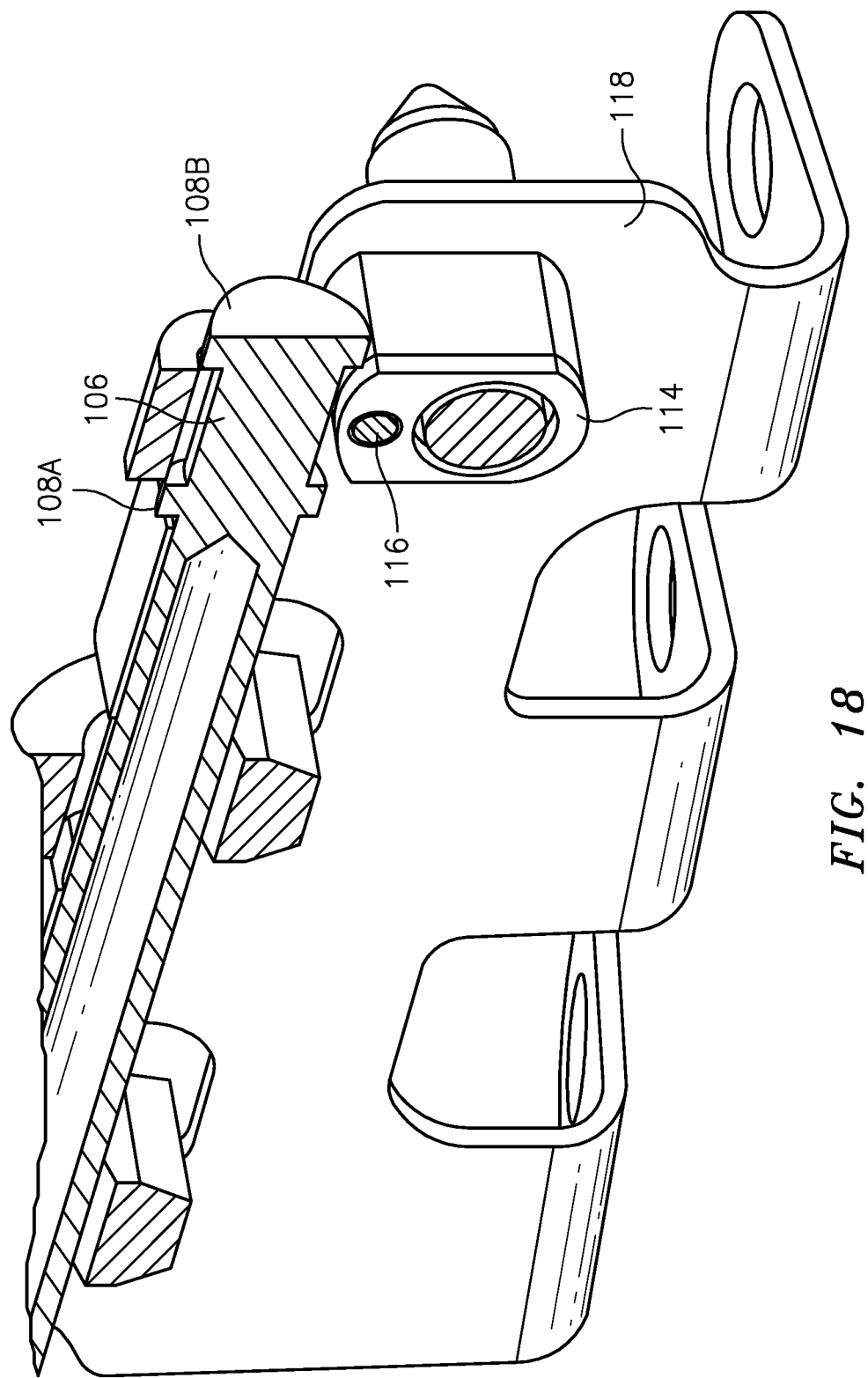
FIG. 18 is a vertical longitudinal sectional view of the hanger system of FIG. 16.

Referring to FIGS. 16-18, another non-limiting embodiment of a hanger system 100 generally includes a pin 102 with a head section 104 having a rectilinear section 106 between circular sections 108A, 108B. A clip assembly 110 includes a slot 112 to receive the rectilinear section 106. The slot 112 is then closed within a block 114 which is retained to the clip 110 with a pin 116. The clip assembly 110 is bolted to a hanger 118 through a fastener 120 and a nutplate 122 as discussed above. The slot 112 permits movement in the Y-direction yet minimizes pin 102 rotational motion and axial motion in the X-axis.

Figure 19:
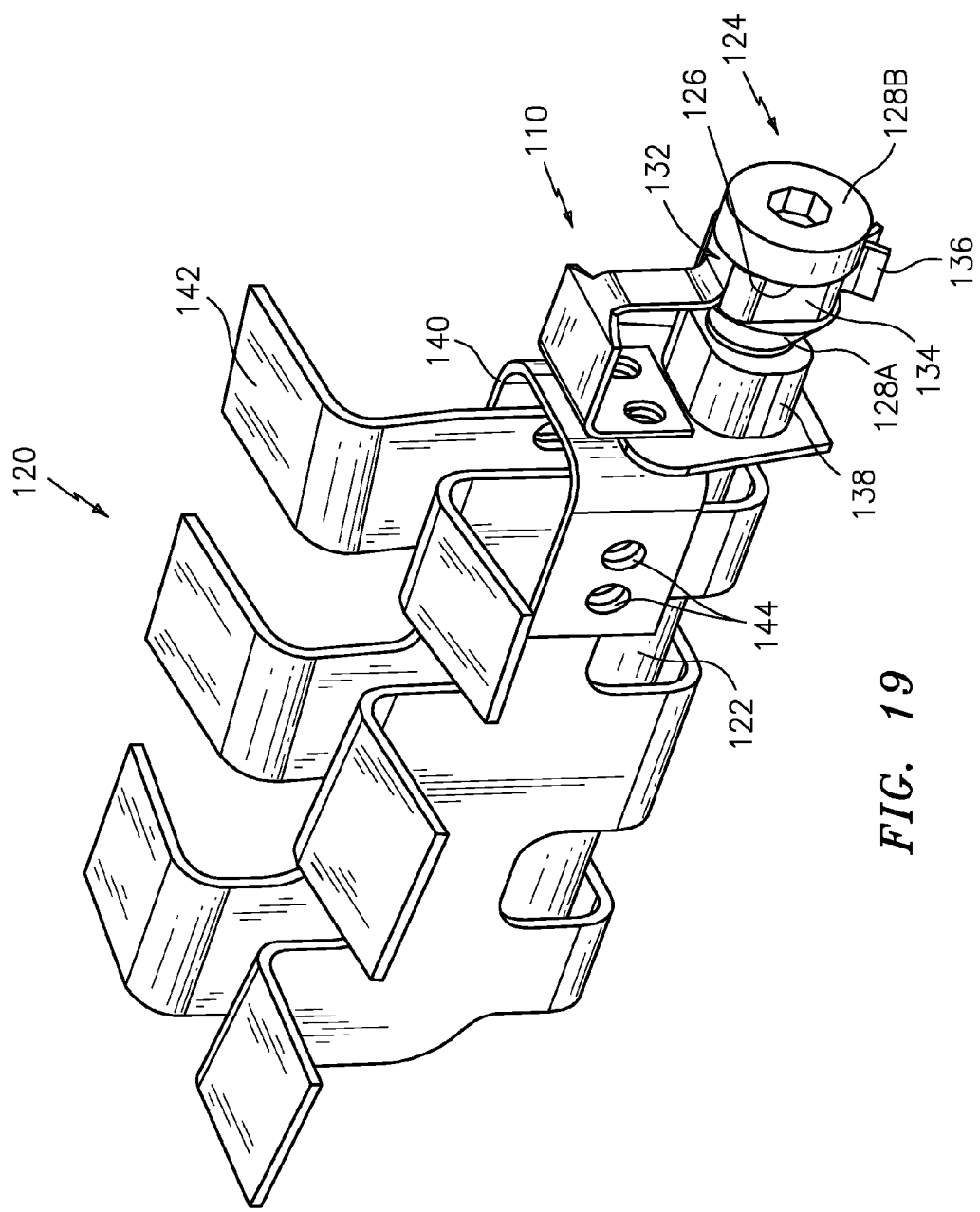
FIG. 19 is a perspective view of a hanger system according to another non-limiting embodiment.

Referring to FIG. 19, another non-limiting embodiment of a hanger system 120 generally includes a pin 122 with a head section 124 having a rectilinear section 126 between circular sections 128A, 128B. A clip assembly 110 includes a clip 132 with a slot 134 to receive the rectilinear section 126. The slot 134 is defined by spring clip 136 which essentially "snap" over the rectilinear section 126. The clip 132 is fastened to a clip receiver 138 and hanger receiver 140 through which the pin 122 is passed. The clip 132 and the clip receiver 138 may be a subassembly with the hanger receiver 140. The hanger receiver 140 is attached to a hanger 142 with fasteners 144. The clip 132 permits movement in the Y-direction yet minimizes pin 122 rotational motion and axial motion in the X-axis.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A hanger system comprising:
a hanger;
a pin with a head section which defines a pin axis;
a clip assembly which captures said head section and permits movement of said pin within said hanger in a direction transverse to said pin axis; and
a fastener which retains said clip assembly to said hanger, wherein the fastener extends through the hanger.

2. The hanger system as recited in claim 1, wherein said head section includes a rectilinear section between a first circular section and a second circular section.

3. The hanger system as recited in claim 2, wherein said rectilinear section is fitted within said clip assembly.

4. The hanger system as recited in claim 3, wherein said rectilinear section is fitted within a slot defined by said clip assembly.

5. The hanger system as recited in claim 4, wherein said clip assembly includes a first clip portion and a second clip portion.

6. The hanger system as recited in claim 1, wherein said fastener includes a bolt and a nutplate, said bolt threaded into said nutplate.

7. The hanger system as recited in claim 6, wherein said nutplate is riveted to said hanger.

8. The hanger system as recited in claim 1, wherein said head section includes an aperture head, said fastener received through said aperture head.

9. The hanger system as recited in claim 8, wherein said aperture head defines a square aperture.

10. The hanger system as recited in claim 8, wherein said aperture head defines a slot aperture.

11. A nozzle for a gas turbine engine comprising:
a liner panel;
a static structure;
a hanger attached to said liner panel;
a pin with a head section which defines a pin axis;
a clip assembly which captures said head section to permit movement of said pin within said hanger in a direction transverse to said pin axis;
a fastener which retains said clip assembly to said hanger; and
an eye-bolt attached to said pin and said static structure.

12. The hanger system as recited in claim 11, wherein said liner panel is located adjacent a corner of said static structure.

13. The hanger system as recited in claim 11, wherein said liner panel transitions from a circular cross-section to a rectilinear in cross-section.

14. The hanger system as recited in claim 11, wherein said liner panel separates core flow from a bypass flow.

15. The hanger system as recited in claim 11, wherein said eye-bolt includes an eye through which said pin is received.

* * * * *